United States Patent [19]
Sula

[11] Patent Number: 5,933,334
[45] Date of Patent: Aug. 3, 1999

[54] ZERO LOAD DEVICE OF POWER SOURCE

[75] Inventor: Matti Sula, Koski, Finland

[73] Assignee: NOKIA Technology GmbH, Pforzheim, Germany

[21] Appl. No.: 09/004,115

[22] Filed: Jan. 7, 1998

[51] Int. Cl.[6] .................................................. H02M 3/335
[52] U.S. Cl. .............................................................. 363/21
[58] Field of Search ................................. 363/16, 20, 21, 363/95, 97, 131

[56] References Cited

U.S. PATENT DOCUMENTS

| | | | |
|---|---|---|---|
| 4,106,084 | 8/1978 | Gilbert | 363/21 |
| 5,278,748 | 1/1994 | Kitajima | 363/21 |
| 5,285,367 | 2/1994 | Keller | 363/21 |
| 5,513,092 | 4/1996 | Goebel | 363/84 |
| 5,675,480 | 10/1997 | Stanford | 363/21 |

*Primary Examiner*—Matthew Nguyen
*Attorney, Agent, or Firm*—Ware, Fressola, Van Der Sluys & Adolphson LLP

[57] ABSTRACT

To the output voltage ($U_o$) of a switched-mode power supply (300) there is connected an adjustable current path (39), through which there is conducted a low current when the output current ($I_o$) given by the power supply is zero or nearly zero. The signal by which the conductivity of the current path is adjusted can be received from any part of the switched-mode power supply where a current or a voltage behaves suitably as a function of the output current.

6 Claims, 3 Drawing Sheets

ZERO LOAD DEVICE OF POWER SOURCE

BACKGROUND OF THE INVENTION

1. Technical Field

In general, the invention relates to controlling the output features of electric power supplies. In particular, the invention relates to stabilizing the output voltage of a switched-mode power supply in a situation where load is not connected to the power supply.

2. Discussion of Related Art

Switched-mode power supplies are generally used in applications where the output voltage and output current of a device generating direct current should be controlled in an accurate and versatile manner. The principle of a switched-mode power supply is the feeding of electric power impulses to an inductive component, which has an energy-storing magnetic field. With a suitable discharge coupling, the stored energy is discharged into output voltage and output current, the values of which can be adjusted by altering the properties of the impulse supply. For the adjusting process, there are known several methods, and one of the most common is to measure the output voltage and/or output current of a power supply and to transmit the response signal describing the measuring result to a circuit that produces the switching pulses regulating the operation of the switching transistor.

FIG. 1 illustrates a simplified prior art switched-mode power supply 1 of the flyback type, including a double-coil transformer 2 for transmitting the electric power from the primary side to the secondary side, and an opto-coupler 3 for transmitting the response signal from the secondary side to the primary side. The primary side receives its electric power from the AC source 4 and via the rectifier 5. The condenser 6 reduces interference in the rectified input voltage and prevents the high-voltage interference created by the switched-mode power supply from proceeding towards the AC source. A PWM (Pulse Width Modulation) controller 7 sends switching pulses to the base of the switching transistor 8, so that the primary current flows via the primary coil 2a during each switching pulse. On the secondary side, a diode 9 and a condenser 10 generate direct current to the output line 11 from the electric power transmitted to the secondary coil 2b, according to the known flyback principle (cf. for example Horowitz P., Hill W.: "The Art of Electronics", 2nd ed., ISBN 0-521-37095-7, Cambridge University Press, N.Y., USA, 1989, p. 355–368).

On the secondary side, a differential amplifier 12 compares the share of the output voltage generated by the voltage divider 13 with the voltage generated by the reference voltage generator 14. If the output voltage rises too high, a signal generated by the differential amplifier 12 lights up a light emitting diode provided in the opto-coupler 3, whereupon the transistor functioning as the other pair of the opto-coupler becomes conductive. Consequently, the simplified control principle of the switched-mode power supply 1 is that the primary side feeds a given maximum quantity of electric power to the transformer, until it receives from the secondary side a signal to the effect that the output voltage rises too high, whereupon the primary side begins to reduce the electric power supply. Often the switched-mode power supply also includes a current limiter arrangement, so that a value of the output current that rises too high causes a signal which is transmitted, via the opto-coupler 3 or via another signal coupler arranged in parallel thereto, to the primary side, where it limits the average electric power supplied into the transformer.

Let us next observe how the switched-mode power supply according to FIG. 1 is applied in a battery charger, i.e. in a device that is use or storing energy in a rechargeable electrochemical battery. Nowadays many portable electric devices are operated by batteries, and the structure and operation of said batteries requires that the charging current and voltage remain within given allowed limits. FIG. 2 illustrates, by way of example, a current-voltage graph, where the striped area 20 represents the range of the allowed current and voltage values. The horizontal axis of the graph represents current and the vertical axis represents voltage. When an empty battery is connected to the battery charger, and the charging current is switched on, the output voltage of the battery charger rises very rapidly from zero to a value describing the terminal voltage of the empty battery; in FIG. 2, this value is represented by the exemplary line 21. The charger must be provided with a current limiter which controls that the output current at this stage remains within given limits, i.e. within the striped area 20. When the battery begins to be charged, in the vicinity of the point 22 the charging current begins to decrease, because now the battery can only receive a small quantity of charging. The voltage limiter provided in the charger keeps the output voltage within the allowed limits between the points 22 and 23. If the battery is disconnected from the charger, but the charger remains switched on, its output voltage and output current are in theory set at the spot described by the point 23.

Known limiter arrangements generally have the drawback that they cannot maintain the output voltage of the switched-mode power supply constant, when the output current decreases very near to zero. In the current/voltage graph, this is shown so that when approaching the point 23 of FIG. 2, the output voltage rises near to the top limit of the allowed range, or even above it. This phenomenon is seen especially clearly in devices that can be adjusted for different output voltages. If we observe a battery charger that is based on a switched-mode power supply and is adjustable for output voltages 3–8 V, the rise of the output voltage with low values of the output current can be for instance 500 mV. Of an output current of eight volts, this constitutes only somewhat over 6%, and thus the share of the overvoltage is relatively small. On the other hand, of a three-volt output voltage, said excessive rise of 500 mV constitutes almost 17%, which already is a fairly large share. Overvoltage can damage a fully charged battery that is connected to a charger.

SUMMARY OF INVENTION

The object of the present invention is to introduce a method and apparatus for stabilizing the output voltage of a switched-mode power supply when the output current is low. Another object of the invention is to introduce a switched-mode power supply where said method and apparatus can be applied. Yet another object of the invention is that it is advantageous to realize in a large-scale serial production of power supplies.

The objects of the invention are achieved by means of an active zero load of the power supply, which zero load consumes a slight amount of current also when there is no other load connected to the switched-mode power supply.

The apparatus according to the invention is characterized in that it comprises an adjustable current path and means for adjusting the electric current proceeding on said current path on the basis of the output current value of the switched-mode power supply.

The switched-mode power supply according to the invention is characterized in that it comprises an adjustable current path connected to its output voltage and means for adjusting the electric current proceeding on said current path on the basis of the output current value of the switched-mode power supply.

The method according to the invention is characterized in that it comprises steps, where there is generated a control signal proportional to the output current of the switched-mode power supply, and on the basis of said control signal, there is adjusted the quantity of electric current proceeding on the adjustable current path connected to the output voltage is adjusted.

In the investigations leading to the present invention, it was found out that the rise in the output voltage of the switched-mode power supply with a low load current is mainly due to the fact that the switching transistor and the connected components feed, even with a low pulse rate, a given amount of electric power to a transformer or to some other power-storing and power-transmitting inductive component, wherefrom it is discharged to the secondary side of the device, or in devices that are not galvanically isolated, to the output parts. When there is no proper load, the supplied electric power is changed into heat in the secondary-side components, where the creation of reference voltages and other marginal factors generates slight electric currents irrespective of the load. The output voltage rises, until the input of current created in between the output voltage terminals—owing to the combined effect of said output voltage and the marginal factors—is equally high as the electric power supplied by the primary side.

According to the invention, on the secondary side of the switched-mode power supply (or to the output parts in galvanically non-isolated devices), there is created a controlled current path, through which the current is conducted when no other load is connected to the power supply, or when only a very low current passes to the load connected to the power supply. The current path is also called zero load, because it serves as the load in cases when the output current is otherwise near to zero. The resistance of the zero load is chosen so that when the impulse ratio of the switching transistor of the switched-mode power supply, and consequently also the electric power to be supplied into the inductive component is at its lowest, the output voltage has the desired value, and the input of current passing through the zero load (added by the electric power consumed by the marginal factors) is equal to said supplied electric power. The signal that switches the zero load on or off according to whether the output current is high or low can be generated in many different ways, and the present invention does not restrict the generation of said signal.

BRIEF DESCRIPTION OF THE DRAWINGS

The invention is explained in more detail below, with reference to a few preferred embodiments presented by way of example, and to the appended drawings, where.

DETAILED DESCRIPTION OF PREFERRED EMBODIMENTS

Figure 1:
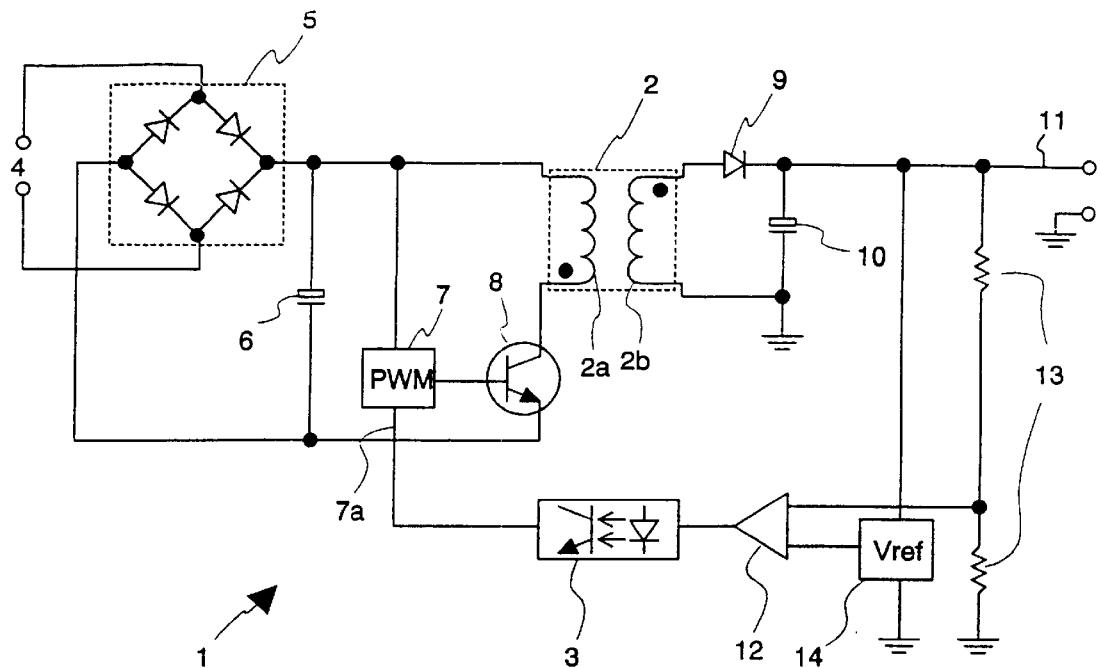
FIG. 1 illustrates a prior art switched-mode power supply.
Figure 2:
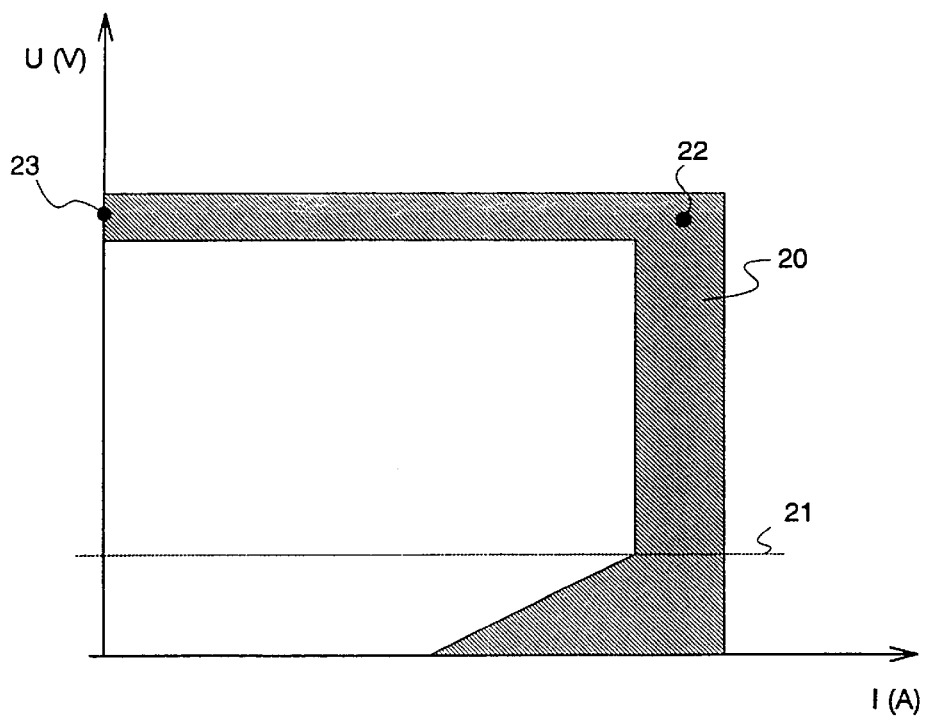
FIG. 2 illustrates a typical graph of allowed current and voltage values for a battery charger.

In the above description of the prior art, we already referred to FIGS. 1 and 2. Accordingly, in the following description of the invention and its preferred embodiments, we shall mainly refer to FIGS. 3–5.

Figure 3:
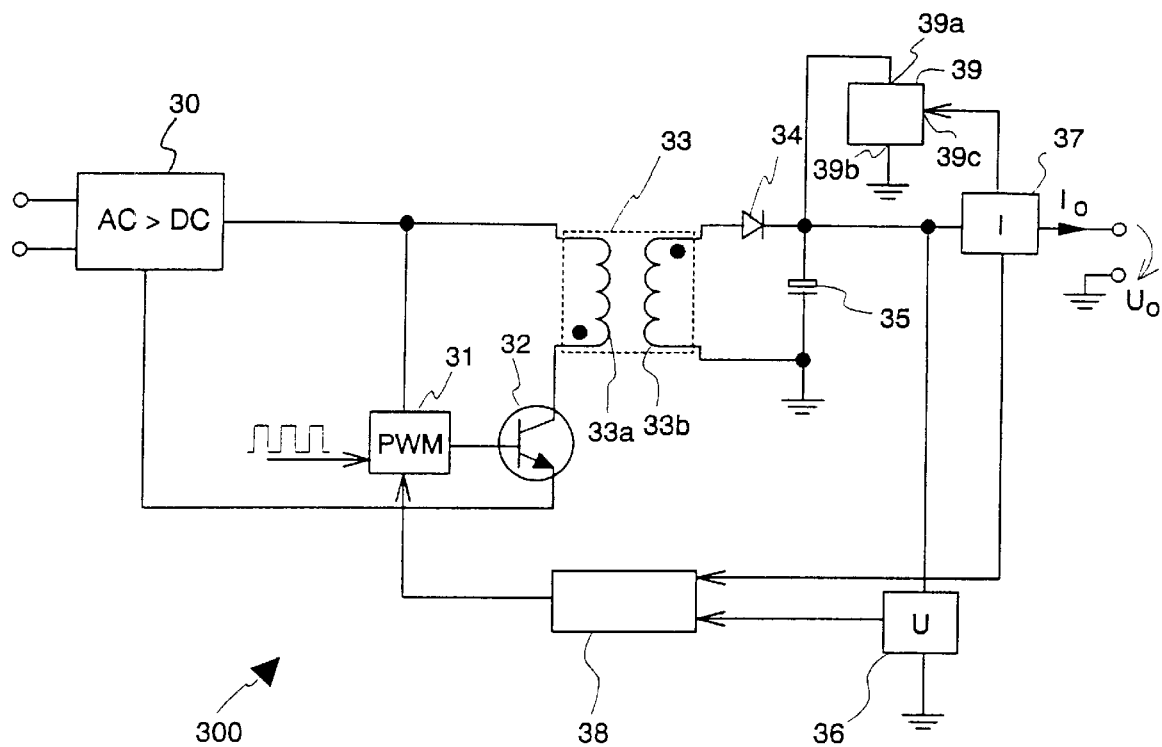
FIG. 3 illustrates how the invention is applied in a switched-mode power supply.

FIG. 3 is a block diagram of a flyback-type switched-mode power supply 300 with a zero load device according to the invention. A rectifier 30 produces rectified input voltage to the primary side. A control circuit 31 sends switching pulses to a switching transistor 32, which due to their effect keeps interrupting the current passing in the primary coil 33a of a transformer 33. A secondary coil 33b of the transformer 33, a secondary side diode 34 and a condenser 35 together generate secondary voltage of the electric power stored in the magnetic field of the transformer 33. A voltage measuring member 36 and a current measuring member 37 measure the output voltage $U_o$ and output current $I_o$. If either the output voltage or the output current or both should be limited, the signal to this effect is transmitted to the primary side through a discriminating element 38. The block 39, coupled in parallel to the condenser 35 of the secondary side, illustrates the zero load device according to the invention, said zero load receiving its control signal from the current measuring member 37.

In order to make the zero load device represented by the block 39 to function according to the invention in the switched-mode power supply illustrated in FIG. 3, said zero load must fulfil the following conditions:

a) When the control signal transmitted to the switching point 39c has a given first value, the resistance between the switching points 39a and 39b must be high. This means a situation where the zero load is not needed. The high resistance ensures that electric current does not pass through the zero load, because said current would only consume in vain such electric power that should be conducted to the proper load in order to achieve an optimal efficiency.

b) When the control signal transmitted to the switching point 39c has a given second value, the resistance between the switching points 39a and 39b must be of a desired, chosen or selected size, and relatively low in comparison to case a) above. This means a situation where there is no proper load, or where the current consumed by the load is very low. Now the resistance between the switching points 39a and 39b must be chosen in the above described manner, i.e. so that the electric power consumed by the zero load and the marginal factors of the secondary side together correspond to the low power that the switched-mode power supply transmits, by intermediation of the transformer 33, from the primary side to the secondary side.

c) The switching point 39c of the control signal does not consume any significant quantity of current, in order to avoid consuming electric power in vain for controlling the zero load.

In most applications, certain additional requirements are set for the zero load device. If the switched-mode power supply of FIG. 3 is for instance a battery charger, the zero load device must not consume current in a situation where the battery charger is switched off, but a fully charged battery is connected thereto. The reason for this requirement is clear: else the zero load device would discharge the battery connected to the charger. In some applications the resistance of the zero load device must be adjustable to several different values.

Figure 4A:
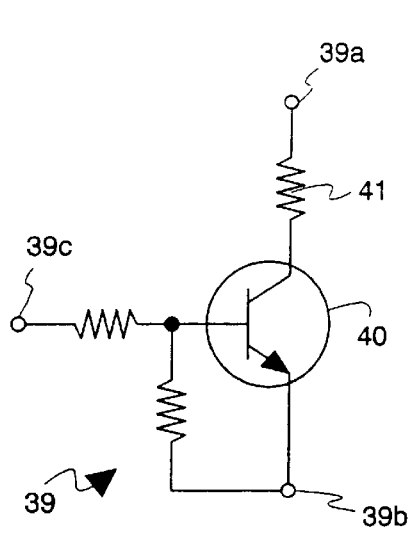
FIGS. 4a and 4b illustrate simple arrangements for realizing the zero load device according to the invention.
Figure 4B:
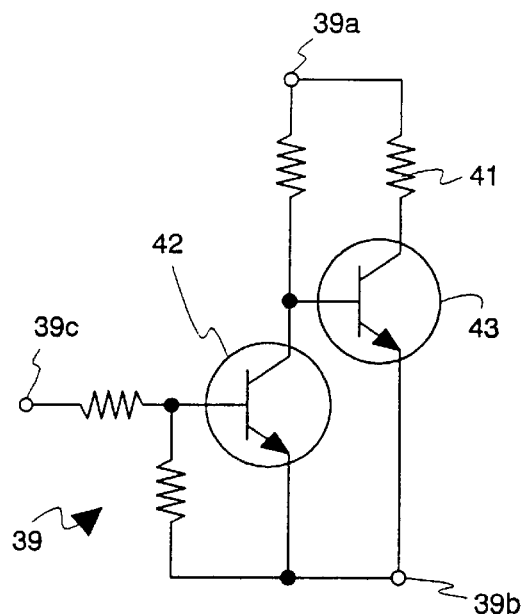

For a man skilled in the art, it is as such easy to construct and design an electronic arrangement that fulfils the above enlisted basic requirements a)–c). The structure of the arrangement is to a certain degree dependent on what are the first and second values of the control signal, and whether the zero load device should be operated on an ON/OFF type basis or in a variable or stepped fashion. FIG. 4a illustrates a simple arrangement based on a switching transistor 40 of the NPN type and a load resistor 41. The switching point 39c is connected to the transistor base, and the connection between the switching points 39a and 39b passes through the transistor 40, from the collector to the emitter, and through the load resistor 41. In this embodiment, the first value of the control signal is zero (without base voltage the transistor 40 is not conductive) and the second value is a positive voltage value that suffices to make the transistor 40 conductive. The resistance between the switching points 39a and 39b is mainly determined by the value of the load resistor 41, and the current passing through the whole arrangement depends, among others, on the amplification ratio of the transistor 40. FIG. 4b illustrates an arrangement that is inverted with respect to the control signal; here the transistor 42 is conductive and the transistor 43 is not conductive, when a positive control voltage is brought to the switching point 39c, and vice versa, when there is no control voltage (assuming that there is a given voltage between the switching points 39a and 39b). When the transistor 43 is conductive, the resistance between the switching points 39a and 39b is determined mainly on the basis of the value of the load resistor 41, and the current passing through the whole arrangement depends, among others, on the amplification ratio of the transistors.

Figure 5:
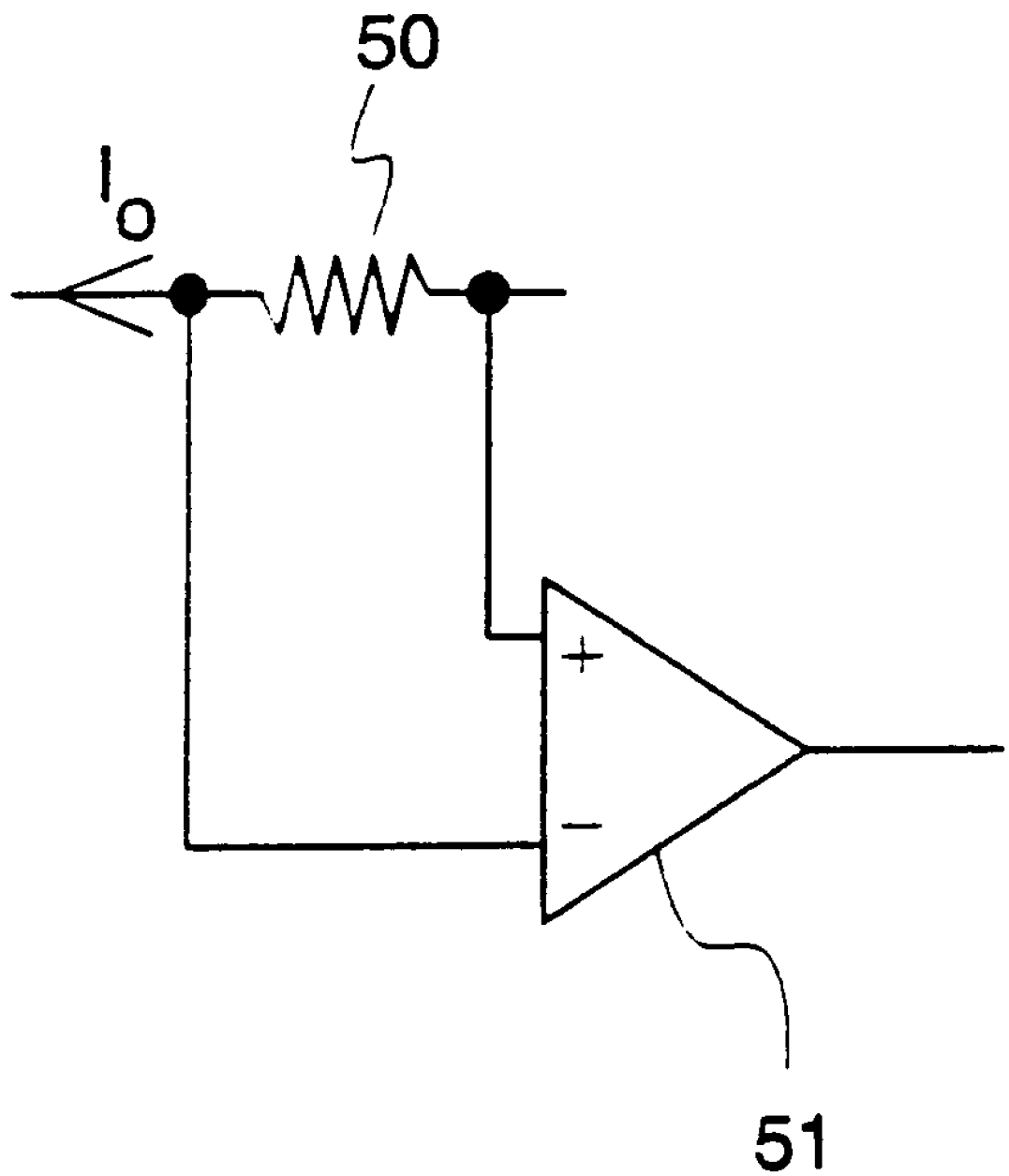
FIG. 5 illustrates a possible method for generating the switching signal for the zero load according to the invention.

For a man skilled in the art, based on the teachings hereof, it also is easy as such to make an arrangement that transmits the desired control signal for the zero load device. An exemplary way of creating the control signal is illustrated in FIG. 5, where the output current $I_o$ passes through a current measurement resistor 50, and a differential amplifier 51 measures the voltage prevailing across the resistor 50. The higher the output current of the power supply is, the higher is the signal given by the differential amplifier, and consequently it can be used as the control signal of the zero load device. Because the zero load device must be switched on when the output current is low, the arrangement illustrated in FIG. 5 is suited to be used with the zero load device illustrated in FIG. 4b. Obviously the control signal need not be formed directly on the basis of the measurement carried out on the output current path, but it can be formed at any point of the power source where a current or voltage is unambiguously dependent on the output current. If we for example know that the voltage between two given points is suitably dependent on the output current, in between said points there can be formed a voltage divider by using two fairly large resistors (fairly large, in order to avoid a significant leakage current from passing through the voltage divider). According to a known voltage division principle, the values of the resistors can be chosen so that the voltage drop over one of the resistors is with each value of the output current suitable to be used as the voltage signal controlling the zero load device.

For information, the patent application "Galvanically isolated power supply with improved reliability", filed in Finland under Ser. No. FI 970060, at the same time as the present application introduces a new arrangement for transmitting the response signal from the secondary side of a galvanically isolated switched-mode power supply to its primary side. There the light emitting diode of the opto-coupler is switched on, when a measurement carried out on the secondary side indicates that the primary side should feed more electric power into the transformer. Respectively, if the light emitting diode fades or is switched off, this indicates that the electric power fed in the transformer should be reduced. In this type of switched-mode power supply, the signal controlling the conductivity of the zero load device can be received from the anode of the light emitting diode of the opto-coupler, which anode has a positive potential when the primary side should feed in more electric power (->high output current consumes output power more than there is available through the transformer) and a potential approaching zero when the feeding of electric power should be reduced (->output current is so low, that it cannot consume all electric power fed into the secondary side through the transformer). Now the zero load must be operated according to FIG. 4b (a positive value of the control signal corresponds to a high resistance of the zero load, and a zero value of the control signal corresponds to a situation where the zero load resistance is relatively low).

With a low load current, a zero load device according to the invention reduces the increase in the output voltage of the switched-mode power supply to be nearly non-existent, and thus it is clearly useful in applications where the output voltage must remain limited irrespective of the output current. The invention requires only the addition of a few small-sized and simple components to a switched-mode power supply that as such conforms to the prior art, wherefore it is well suited to such devices, manufactured in a large-scale serial production, where the manufacturing costs and the space required by the components must both be minimized.

The above described preferred embodiments that were explained by way of example should not be understood as restricting the invention, but the modifications of the invention can vary within the range of the know-how typical for a man skilled in the art and within the scope of the appended claims.

I claim:

1. An apparatus (39) for internally stabilizing an output voltage ($U_o$) in a switched-mode power supply (300) with an output current ($I_o$) that can vary within given limits, characterized in that it comprises a feedback path (38) and an adjustable current path (39a- 41-40-39b, 39a-41-43-39b) different from said feedback path and means (40, 42, 43) for adjusting an electric current passing through said current path in response to a control signal having a magnitude indicative of the output current of the switched-mode power supply, wherein said adjustable current path is arranged to adjust the electric current passing through said current path to an insignificantly low magnitude when the control signal has a given first value, and to a selected magnitude when the control signal has a given second value that corresponds to a lower value of the output current of the switched-mode power supply than said first value.

2. A switched-mode power supply (300) having an output voltage ($U_o$) having a varying magnitude and a corresponding output current ($I_o$) having a varying magnitude, at least one of said output voltage and said output current sensed for use in a feedback path for controlling said switched-mode power supply, characterized in that said switched-mode power supply further comprises an adjustable current path (39) different from said feedback path and connected to said output voltage and means (37) for adjusting an electric current passing on said current path according to the varying magnitude of the output current of the switched-mode power supply, wherein said adjustable current path is arranged to adjust the electric current passing through said current path to an insignificantly low magnitude when the control signal has a given first value, and to a selected magnitude when the control signal has a given second value that corresponds to a lower value of the output current of the switched-mode power supply than said first value.

3. A switched-mode power supply according to claim 2, characterized by two points, a voltage prevailing between said points depending in a known way on the output current, as well as means for providing a signal for adjusting a magnitude of the electric current passing through the adjustable current path according to the voltage prevailing between said two points.

4. A switched-mode power supply according to claim 2, which also comprises an isolation transformer (33) provided with a primary coil (33a) and a secondary coil (33b), as well as a diode (34) and a condenser (35) coupled in series in between terminals of the secondary coil, characterized in that said adjustable current path is coupled in parallel with said condenser.

5. A switched-mode power supply having an output voltage ($U_o$) having a varying magnitude and a corresponding output current ($I_o$) having a varying magnitude, characterized in that said switched-mode power supply includes an adjustable current path (39) connected to said output voltage and means (37) for adjusting an electric current passing on said current path according to the varying magnitude of the output current of the switched-mode power supply, and in that it includes a measuring device (37; 50, 51) for providing a voltage that is proportional to the output current, a first switching transistor (42) and a second switching transistor (43), said second switching transistor (43) constituting a current-adjusting element of the adjustable current path, which are arranged so that when rising to a selected high level, said voltage that is proportional to the output current switches said first switching transistor (42) to a conductive state, in which case it in turn switches said second switching transistor (43) to a non-conductive state.

6. A method for stabilizing an output voltage ($U_o$) of a switched-mode power supply (300), comprising the steps of:

providing a control signal proportional to an output current of the switched-mode power supply, and in response to said control signal, adjusting a magnitude of an electric current passing through an adjustable current path (39) connected to the output voltage, wherein the magnitude of the electric current passing through said adjustable current path is adjusted to a given first magnitude when the output current of the switched-mode power supply significantly deviates from zero, and to a given second magnitude, which is higher than said first magnitude, when the output current of the switched-mode power supply does not significantly deviate from zero.

* * * * *

UNITED STATES PATENT AND TRADEMARK OFFICE
CERTIFICATE OF CORRECTION

PATENT NO.   : 5,933,334                    Page 1 of 2
DATED        : August 3, 1999
INVENTOR(S)  : M. Sula It is certified that error appears in the above-indentified patent and that said Letters Patent is hereby corrected as shown below:

In the Drawings, at Sheet 2 of 3, in Fig. 3, please add --DISCRIMINATING ELEMENT-- to Box 38, and please add --ZERO LOAD DEVICE-- to Box 39.

Signed and Sealed this

Third Day of April, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 5,933,334
DATED : August 3, 1999
INVENTOR(S) : M. Sula

Page 2 of 2

It is certified that error appears in the above-indentified patent and that said Letters Patent is hereby corrected as shown below:

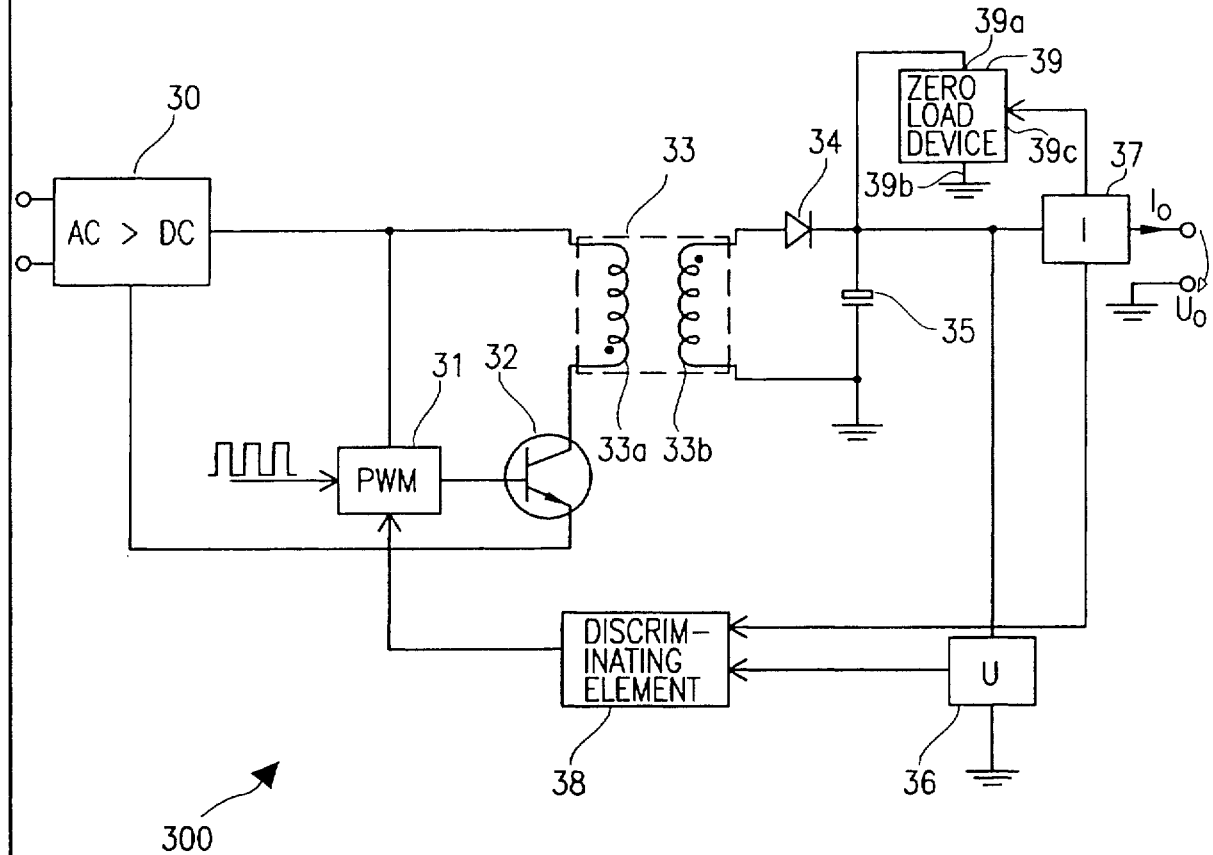

FIG. 3